(12) United States Patent
Fielden et al.

(10) Patent No.: US 7,833,486 B2
(45) Date of Patent: Nov. 16, 2010

(54) HYDROPHILIC/HYDROPHOBIC SURFACES

(75) Inventors: Matthew Fielden, Oesundsbro (SE); Therese Sennefors, Danderyd (SE); Helene Dérand, Taby (SE)

(73) Assignee: Gyros Patent AB, Uppsala (SE)

( * ) Notice: Subject to any disclaimer, the term of this patent is extended or adjusted under 35 U.S.C. 154(b) by 732 days.

(21) Appl. No.: 11/283,952

(22) Filed: Nov. 21, 2005

(65) Prior Publication Data

US 2006/0278287 A1    Dec. 14, 2006

Related U.S. Application Data

(63) Continuation of application No. PCT/SE2004/000794, filed on May 19, 2004.

(60) Provisional application No. 60/472,924, filed on May 23, 2003, provisional application No. 60/559,565, filed on Apr. 5, 2004.

(30) Foreign Application Priority Data

May 23, 2003  (SE) ................................. 0301539
Apr. 5, 2004  (SE) ................................. 0400917

(51) Int. Cl.
    *F15B 21/00*  (2006.01)
(52) U.S. Cl. ............... 422/100; 436/180; 435/288.5; 137/833
(58) Field of Classification Search ............... 422/100; 435/288.5; 436/180; 137/833, 806
    See application file for complete search history.

(56) References Cited

U.S. PATENT DOCUMENTS

| | | | |
|---|---|---|---|
| 4,676,274 A | 6/1987 | Brown | |
| 5,424,219 A | 6/1995 | Jirikowski | |
| 6,287,872 B1 | 9/2001 | Schurenberg et al. | |
| 6,296,020 B1 * | 10/2001 | McNeely et al. | ............ 137/806 |
| 6,322,682 B1 | 11/2001 | Arvidsson et al. | |
| 6,591,852 B1 | 7/2003 | McNeely et al. | |
| 6,601,613 B2 | 8/2003 | McNeely et al. | |
| 6,632,656 B1 | 10/2003 | Thomas | |
| 6,637,463 B1 | 10/2003 | Lei et al. | |
| 6,653,625 B2 | 11/2003 | Andersson et al. | |
| 6,717,136 B2 | 4/2004 | Andersson et al. | |
| 6,812,456 B2 | 11/2004 | Andersson et al. | |
| 6,812,457 B2 | 11/2004 | Andersson et al. | |
| 6,852,851 B1 | 2/2005 | Kenrick et al. | |
| 6,884,395 B2 | 4/2005 | Andersson et al. | |
| 6,919,058 B2 | 7/2005 | Andersson et al. | |
| 6,955,738 B2 | 10/2005 | Derand et al. | |
| 6,967,101 B1 | 11/2005 | Larsson et al. | |

(Continued)

FOREIGN PATENT DOCUMENTS

EP    1053784    11/2000

(Continued)

*Primary Examiner*—Jill Warden
*Assistant Examiner*—Shogo Sasaki
(74) *Attorney, Agent, or Firm*—Fulbright & Jaworski L.L.P.

(57) ABSTRACT

A microfluidic device that comprises one or a plurality of microchannel structures each of which comprises a microconduit for transport and/or processing of liquid, the inner surface of which comprises a hydrophilic liquid contact surface area (surface area 1) that is delineated in at least one direction by a boundary to a hydrophobic surface area (surface area 2). The characteristic feature is that surface area 2 comprises a rough part that stretches along the boundary.

22 Claims, 3 Drawing Sheets

U.S. PATENT DOCUMENTS

| | | | |
|---|---|---|---|
| 6,985,672 B2 | 1/2006 | Andersson et al. | |
| 6,990,290 B2 | 1/2006 | Andersson et al. | |
| 6,992,181 B2 | 1/2006 | Tooke et al. | |
| 7,459,129 B2 * | 12/2008 | Andersson et al. | 422/100 |
| 2002/0125135 A1 | 9/2002 | Larsson et al. | |
| 2003/0029724 A1 | 2/2003 | Derand et al. | |
| 2003/0053934 A1 | 3/2003 | Andersson et al. | |
| 2003/0054563 A1 | 3/2003 | Ljungstrom et al. | |
| 2003/0066959 A1 | 4/2003 | Andersson et al. | |
| 2003/0129360 A1 | 7/2003 | Derand et al. | |
| 2003/0143114 A1 | 7/2003 | Andersson et al. | |
| 2003/0156763 A1 | 8/2003 | Soderman | |
| 2003/0173650 A1 * | 9/2003 | Larsson et al. | 257/622 |
| 2003/0211012 A1 | 11/2003 | Bergstrom et al. | |
| 2004/0058408 A1 | 3/2004 | Thomas et al. | |
| 2004/0096867 A1 | 5/2004 | Andersson et al. | |
| 2004/0099310 A1 | 5/2004 | Andersson et al. | |
| 2004/0120856 A1 | 6/2004 | Andersson et al. | |
| 2004/0202579 A1 | 10/2004 | Derand et al. | |
| 2005/0042770 A1 | 2/2005 | Derand et al. | |
| 2005/0141344 A1 | 6/2005 | Ekstrand et al. | |
| 2005/0153431 A1 | 7/2005 | Andersson et al. | |
| 2005/0153432 A1 | 7/2005 | Andersson et al. | |
| 2005/0153433 A1 | 7/2005 | Andersson et al. | |
| 2005/0153434 A1 | 7/2005 | Andersson et al. | |
| 2005/0177195 A1 | 8/2005 | Salo | |
| 2005/0179901 A1 | 8/2005 | Ostlin et al. | |
| 2005/0186685 A1 | 8/2005 | Kange et al. | |
| 2005/0202471 A1 | 9/2005 | Tooke et al. | |
| 2005/0214442 A1 | 9/2005 | Larsson et al. | |
| 2005/0279925 A1 | 12/2005 | Andersson et al. | |
| 2006/0002825 A1 | 1/2006 | Derand et al. | |
| 2006/0110294 A1 * | 5/2006 | Engstrom et al. | 422/100 |
| 2006/0159592 A1 * | 7/2006 | Andersson et al. | 422/100 |
| 2006/0194273 A1 * | 8/2006 | Thomas | 435/29 |

FOREIGN PATENT DOCUMENTS

| | | |
|---|---|---|
| GB | 1474017 | 5/1977 |
| WO | WO-98/15356 | 4/1998 |
| WO | WO-99/17093 | 4/1999 |
| WO | WO-99/58245 | 11/1999 |
| WO | WO-00/25921 | 5/2000 |
| WO | WO-00/40750 | 7/2000 |
| WO | WO-00/62042 | 10/2000 |
| WO | WO-01/02737 | 1/2001 |
| WO | WO-01/07161 | 2/2001 |
| WO | WO-01/30500 | 5/2001 |
| WO | WO-02/41995 | 5/2002 |
| WO | WO-02/41996 | 5/2002 |
| WO | WO-02/42650 | 5/2002 |
| WO | 02074438 A2 | 9/2002 |
| WO | WO-02/085520 | 10/2002 |
| WO | WO-2004/067444 | 8/2004 |
| WO | WO-2004/083108 | 9/2004 |
| WO | WO-2004/083109 | 9/2004 |
| WO | WO-2004/091792 | 10/2004 |
| WO | WO-2004/103890 | 12/2004 |
| WO | WO-2004/106926 | 12/2004 |

* cited by examiner

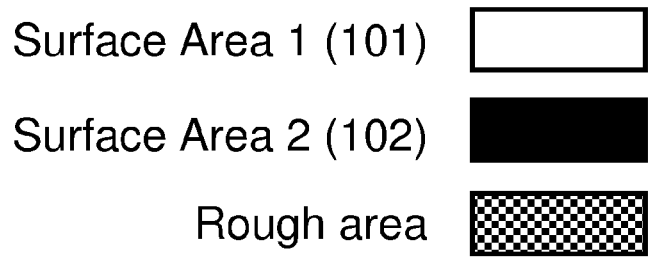
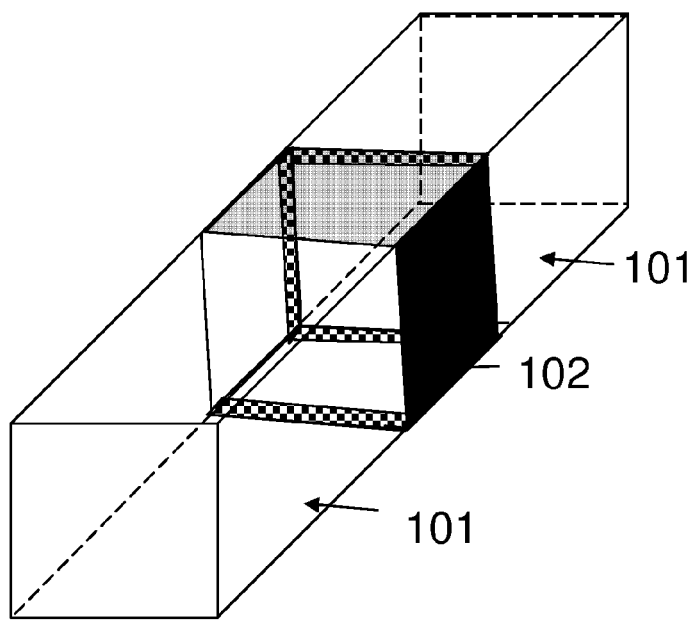
FIG. 1

HYDROPHILIC/HYDROPHOBIC SURFACES

CROSS-REFERENCE TO RELATED APPLICATIONS

This application is a continuation application of International Application No. PCT/SE2004/000794 filed May 19, 2004 which claims priority to U.S. Provisional Application Nos. 60/472,924 filed May 23, 2003 and 60/559,565 filed Apr. 5, 2004. This application also claims priority to Swedish Application Nos. 0301539-3 filed May 23, 2003 and 0400917-1 filed Apr. 5, 2004.

TECHNICAL FIELD

The present invention relates to a surface that comprises a hydrophilic part delineated in at least one direction by a boundary to a hydrophobic part. The hydrophilic part is intended for retaining or withholding a liquid from spreading into the hydrophobic part and the hydrophobic part for directing liquid into the hydrophilic part. The hydrophilic part will alternatively be called "hydrophilic liquid contact surface" or "surface area 1", and the hydrophobic part for "hydrophobic surface area" or "surface area 2".

This combination of hydrophilic and hydrophobic surfaces is according to the present invention primarily associated with a microchannel structure of a microfluidic device, either completely on inner walls of the microchannel structure or with the hydrophobic surface area being associated with an outer surface that at least partly surrounds an opening of the microchannel structure (to ambient atmosphere).

The surface tension of the liquids concerned is $\geq 5$ mN/m, preferably $\geq 10$ mN/m or $\geq 20$ mN/m and are primarily aqueous.

The terms hydrophilic (wettable) and hydrophobic (non-wettable) contemplate that a surface has a water contact angle $\leq 90°$ or $\geq 90°$, respectively. Hydrophobic compounds or agents are substances that when applied as a coating on a smooth surface gives the surface a water contact angle $\geq 90°$, such $\geq 100°$ or $\geq 110°$. Typically this kind of substances is insoluble in water and may be polymeric or non-polymeric.

BACKGROUND OF THE INVENTION

Boundaries between hydrophilic and hydrophobic surfaces have previously been utilized in applications where a liquid is to be retained on the hydrophilic side of the boundary for shorter or longer periods of time. In microfluidics this kind of boundary has been used in fluidic functions such as passive valves, anti-wicking functions, vents, liquid-directing functions etc. See for instance: WO 9958245, WO 0185602, WO 02074438, WO 03018198, and WO 03024598 (all of Gyros AB); U.S. Pat. No. 6,926,020, U.S. Pat. No. 6,591,852, U.S. Pat. No. 6,601,613 and U.S. Pat. No. 6,637,463 (all of Biomicro); WO 0190614 (Micronics); WO 9917093 (University of Michigan); U.S. Pat. No. 4,676,274 (Brown); WO 0187486 (Gamera/Tecan); WO 0241996, WO 0242650, and WO 0241995 (all of Pyrosequencing AB); etc.

Hydrophilic surfaces in the form of spots and delineated by boundaries to hydrophobic parts have also been used to collect and/or concentrate aliquots of aqueous liquids to the hydrophilic spots. See for instance U.S. Pat. No. 6,287,872 (Bruker Daltonik GmbH) and WO 9815356 (Molecular Drives Ltd). Hydrophobic spots on a hydrophilic surface have been described in EP 1053784 (Norhoff et al).

A "dispensation" plate comprising on one side larger hydrophilic spots/wells for storing of liquid and on the opposite side smaller hydrophilic spots/wells and a transport capillary between each pair of large and small spot/well. Each hydrophilic spot/well is surrounded by a hydrophobic surface that may be rough. See WO 0107161 (Merck & Co).

Boundaries between hydrophilic and hydrophobic surface areas have been combined with a change in geometric surface characteristics. See the anti-wicking functions described as unit 7 in WO 02074438 (Gyros AB) and the "wells" described in WO 9815356 (Molecular Drives Ltd).

When transporting liquid aliquots through a microchannel structure comprising boundaries of the type discussed above the liquid typically will pass the hydrophobic surface area (surface area 2). Many of the liquids used contain dissolved components that will have a tendency to adsorb to hydrophobic surfaces, for instance surface active components such as detergents and components that exhibit peptide structure (e.g. oligo/polypeptides including proteins). This may be harmful for a fluidic function that is defined by a boundary between a hydrophilic and a hydrophobic surface. The risk for failures in a microchannel structure will increase with its number of surface areas 2/boundaries. The function of valves, vents, anti-wicking functions etc may be disturbed, and not function properly when contacted with liquid a second time, a third etc time etc. Undesired wicking, leakage and spreading of liquid may occur.

Rough/grainy hydrophobic surfaces have been proposed to be particularly suitable for the immobilization of bioaffinity reagents (beads, microtiter wells, fibers tubes etc) (U.S. Pat. No. 5,424,219 (Cytech Biomedical)).

BRIEF SUMMARY OF THE INVENTION

The primary object of the invention is to provide microfluidic devices comprising hydrophilic liquid contact surfaces that have an improved capability of retaining or withholding a liquid of the type discussed above, and hydrophobic surfaces that have an improved capability of directing liquids of the type discussed above into hydrophilic liquid contact surfaces. The liquid concerned may be aqueous and/or have a selected surface tension $\leq 30$ mN/m or $\leq 25$ mN/m, such as in the interval from 10 mN/m and upwards.

Another object is to provide microfluidic devices comprising passive valves, anti-wicking functions, vents, liquid-directing functions etc that are based on a boundary between a hydrophilic and hydrophobic surface and that have an improved function, e.g. by permitting repetitive contact with liquids of the kind discussed above.

BRIEF DESCRIPTION OF THE DRAWINGS

FIG. 1 illustrates a microconduit comprising Surface Area 1 (SA1), Surface Area 2 (SA2), and a rough area.

DETAILED DESCRIPTION OF THE INVENTION

The Invention

Figure 2:
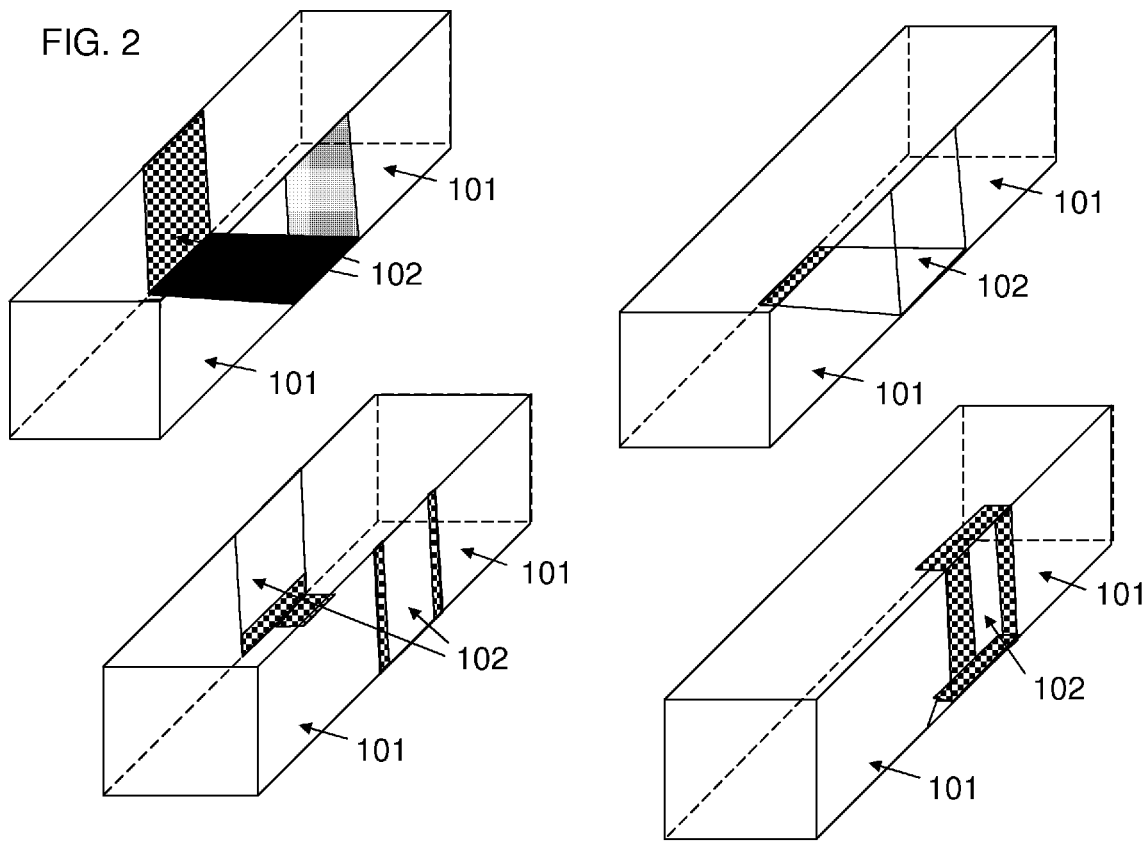
FIG. 2 illustrates different configurations of a microconduit comprising SA1, SA2, and a rough area.

The present inventors have recognized that these objects can be accomplished in the case that the hydrophobic part comprises a rough part, i.e. a part with a rough surface that stretches essentially along the boundary on the hydrophobic side.

The invention will have particular advantages for protocols which comprise that at least two liquid aliquot (for instance aliquot I before aliquot II that is before aliquot III etc) is passing the same surface area 2 of a fluidic function of a microchannel structure, for instance with a preceding aliquot that contains harmful substances as discussed above. For this kind of protocols the invention implies that it will be easier to carry out large numbers of parallel runs of essentially the same protocol in the same microfluidic device with a low number of failures, for instance in $\geq 5$ microchannel structures, such as $\geq 10$ or $\geq 15$ or $\geq 25$ microchannel structures, typically with no failure of the type discussed above for typical sets of parallel runs. The advantages will become more apparent for increasing number of local surface areas 2 and/or of boundaries per microchannel structure or per flow path that is common for transportation of the aliquots. Thus the largest advantages will be at hand for a microchannel structure/common flow path that comprises two three, four, five, six or more local surface areas 2 and/or of boundaries per microchannel structure/common flow path. The same also applies to the fluidic functions discussed herein. These hydrophobic areas (surface areas 2) may be different and parts of different fluidic functions.

The rough part or zone is preferably directly associated with the boundary but there are variants in which there is a hydrophobic zone with a smooth finish between the boundary and the rough part. The hydrophilic part may also comprise a rough part.

A smooth surface is a surface that is not rough.

The roughness may have been obtained from a smooth surface in two major ways: 1) additive roughening and 2) destructive roughening. Both ways may encompass so-called mechanical and/or chemical roughening. Roughness may also be introduced when a surface is initially formed, for instance by molding, embossing, cutting etc.

Mechanical additive roughening typically comprises that particles are randomly distributed and adhered to a surface. The particles used typically correspond to a population of particles having a mean diameter $\leq 15$ μm, such as $\leq 10$ μm or $\leq 5$ μm or $\leq 1$ μm and $\geq 0.01$ μm, such as $\geq 0.1$ μm or $\geq 0.5$ μm or $\geq 1$ μm. In the case the boundary is located at an enclosed microcavity/microchannel, the upper limit for the mean diameters is typically $\leq 10\%$, such as $\leq 5\%$, of the largest cross-sectional dimension (width or depth) at the rough surface in the microcavity/microchannel. These particle sizes refer to the particles as they appear on the hydrophobic surface, e.g. to particle agglomerates if the particles tend to adhere to each other. The particles are typically in the shape of spheres or spheroids, i.e. beaded. Alternatively the particles may have irregular forms. In the case of irregular forms and spheroids the diameters above refer to the "hydrodynamic" diameter.

The particles may expose a hydrophilic or a hydrophobic surface and be porous or non-porous and/or comprise none, one, two or more enclosed holes (hollow particles) etc. In the case the particles are applied in dispersed form to the surface there may be advantages in combining liquid properties with density and/or the size of the particles such that the particles are maintained suspended during application to the surface. Typical particle material includes a) inorganic material such as glass, e.g. borosilicate glass, silica, metal, metal oxide, graphite etc, and b) organic material, such as organic polymers based on monomers comprising polymerizable unsaturation and/or other groups that permit polymerization, for instance polymerizable functional groups comprising heteroatoms selected amongst oxygen, sulphur and nitrogen that may or may not participate in the formation of so-called condensation polymers or addition polymers. Inorganic material may also be polymeric.

There are a number of ways to adhere particles to a surface. The particle as such and/or the surface may be self-adhering to each other and/or pretreated with an adherence-promoting agent. This agent may be an adhesive or it may be a solvent partially dissolving an outer layer of the surface or the particles. Alternatively, particles may be distributed on the surface together with a suitable adherence-promoting agent. Moreover, non-sticky particles may be applied to the surface followed by deposition of an adherence-promoting coating.

The application of the particles and the adherence-promoting agent to a surface is typically by printing, spraying, painting and the like.

In a preferred variant the particles are distributed on the surface in dispersed form together with an adherence-promoting agent dissolved or dispersed in the liquid phase of the dispersion. The adherence-promoting agent in this variant is typically a polymer, but also non-polymeric compounds may be used provided they are able to promote adherence. Suitable polymers may be found amongst polymers that are based on monomers comprising polymerizable unsaturation and/or other groups that permit polymerization, for instance polymerizable functional groups comprising heteroatoms selected amongst oxygen, sulphur and nitrogen that may or may not participate in the formation of so-called condensation polymers or addition polymers. The adherence-promoting agent may be hydrophilic or hydrophobic.

Additive chemical roughening comprises that a chemical or physical reaction is carried out on a surface or in the proximity of the surface, leading to deposition of material on the surface, for instance as precipitates/crystals.

Destructive mechanical roughening comprises methods such as grinding, blasting, etc.

In destructive chemical roughening the surface is degraded in local spots to create small wells, indentation, protrusions and the like. This kind of roughening may be carried out by etching, irradiation etc.

The irregularities in depth/height in rough surfaces obtained by other routes than additive mechanical roughening are typically within the same ranges as for additive mechanical roughening.

After the roughening process the surface may be provided with a surface coating of the desired hydrophobicity. This may in particular be important if the starting surface, the particles, an adhesive, and/or a used adherence-promoting agent is hydrophilic. The method and agents used for introducing a hydrophobic coating at this stage follow the same principles as is well-known in the field of coating. Typically the roughened surface is then coated with a hydrophobic compound, for instance a fluorinated hydrocarbon, paraffin and the like. The preferred surface coatings are typically hydrophobic and in the form of polymers or copolymers that may or may not have been cross-linked, for instance based on ethylene, propylene, butadiene, fluorinated alkenes, etc. Suitable hydrophobic polymers can be found amongst polymers that are based on monomers comprising polymerizable unsaturation and/or other groups that permit polymerization, for instance polymerizable functional groups comprising heteroatoms selected amongst oxygen, sulphur and nitrogen that may or may not participate in the formation of so-called condensation polymers or addition polymers. See the experimental part, U.S. Pat. No. 6,447,919 (Cytonix), and WO 2004103891 and the corresponding US application 20050042770 (Both of Gyros AB).

Roughness may be expressed as arithmetic average roughness ($R_a$), which is also known as arithmetic average (AA), centre line average (CLA), and arithmetical mean deviation of the profile. This kind of roughness corresponds to the area between the roughness profile and its mean line, or the integral of the absolute value of the roughness profile height over the evaluation length:

$$R_a = \frac{1}{L}\int_0^L |r(x)|dx$$

When evaluated from digital data, the integral is normally approximated by a trapezoidal rule:

$$R_a = \frac{1}{N}\sum_{n=1}^N |r_n|$$

Graphically, the average roughness is the area between the roughness profile and its centre line divided by the evaluation length (normally five sample lengths with each sample length equal to one cutoff).

In the formula above L is evaluation length, r(x) is roughness at position x, N is total number of values and $r_n$ is roughness at pixel n.

Effective roughness $R_a$ for the invention is typically found within the intervals of 0.01-15 μm, such as 0.1-15 μm or 0.5-10 μm.

The optimal interval of the depths and heights of the indentations and/or projections/protrusions, respectively, in the rough surface depends on a) the liquid to be used, for instance its surface tension, b) whether or not the surface is part of an enclosed microconduit/microcavity and the dimensions of such a microconduit/microcavity etc. Typically experimental testing is required for optimization. The same also applies for $R_a$-values.

In many variants of the invention, application of the present innovative principle means that the water contact angle macroscopically is increased, e.g. with ≧2°, such as ≧4° or ≧5° or ≧10°, compared to the hydrophobic zone without the roughening.

In preferred variants the water contact angle of surface area 1 is selected in the interval ≦60° such as ≦50° or ≦40° or ≦30° or ≦20°. Surface contact angle ≧100°, such as ≧110° or ≧125° or ≧135°, and may be superhydrophobic, i.e. a water contact angle above 150°.

The intervals for water contact angles refer to static water contact angles and advancing water contact angles. Advancing angles typically are higher than static angles.

Contact angles refer to values at the temperature of use, typically +21° C., are static or advancing. Static angles are measured by the method given in WO 0056808 (Gyros AB). Advancing angles are measured as given in the experimental part.

The innovative principle is applicable to surfaces made of different kinds of material. Typical material includes a) inorganic material such as glass, e.g. borosilicate glass, silica, metal, metal oxide, etc, and b) organic material, such as organic polymers (plastic material) based on monomers comprising polymerizable unsaturation and/or other groups that permit polymerization, for instance polymerizable functional groups comprising heteroatoms selected amongst oxygen, sulphur and nitrogen.

The hydrophilic liquid contact surface, the hydrophobic surface and the boundary are typically present as a part of a passive valve, an anti-wicking function, a vent, a liquid-directing function and the like in an enclosed microchannel structure of a microfluidic device. The hydrophobic surface area of certain liquid-directing functions may be present on the outer surface of a microfluidic device as discussed above under the heading "Technical Field".

Passive valves, anti-wicking functions and vents that utilize the innovative principle are typically present in microconduit parts of microchannel structures in which the intersections of inner side-walls define one, two, three, four or more length-going edges. See for instance FIG. 1 of WO 02074438 (Gyros AB). The boundary and/or rough part/zone of the hydrophobic part/zone (surface area 2) typically stretch between two edges of one, two or more of the inner sidewalls (=top wall, bottom wall and walls between top and bottom walls), preferably at least in opposing sidewalls and/or preferably starting in the edges of an inner wall concerned. In other words for each of the functions, one, two, three or more inner sidewalls may comprise the boundary and a surface area 1 (101) and a surface area 2 (102) that defines the boundary. The direction of the boundary is preferably essentially perpendicular to the flow direction, i.e. 90°±45°.

Figure 3:
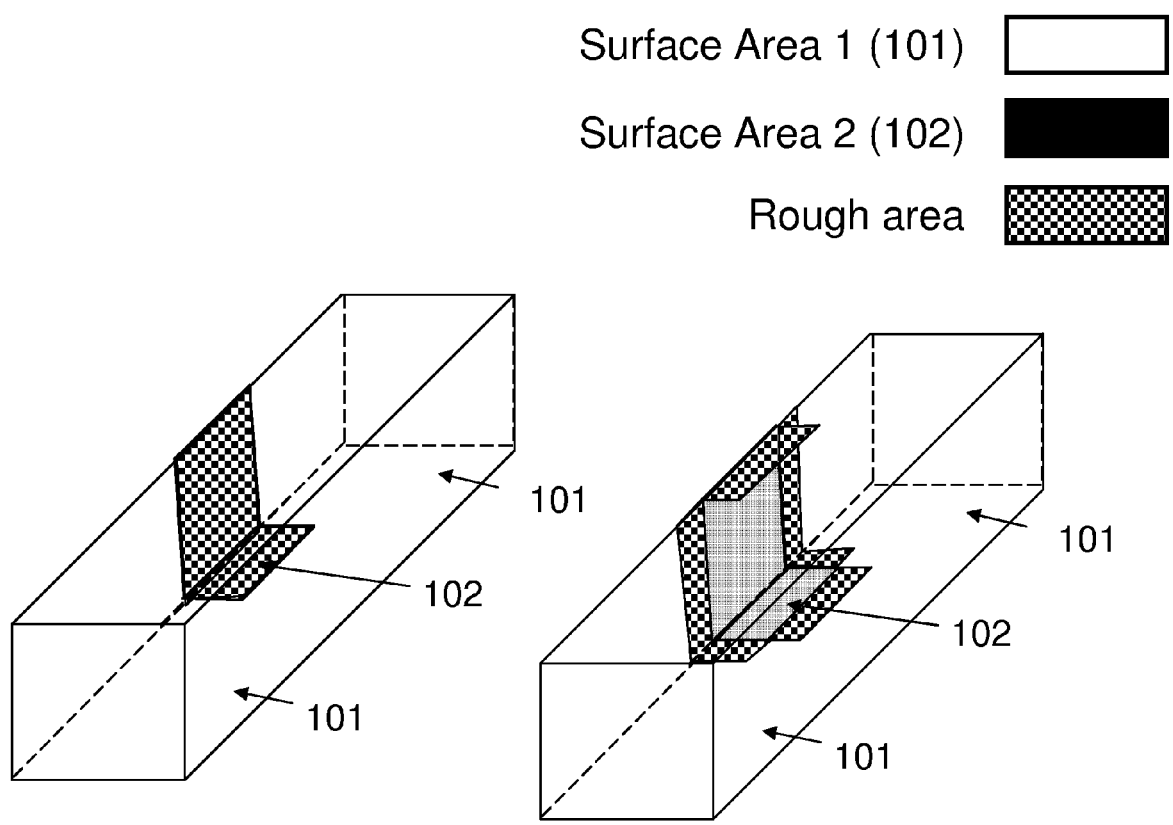
FIG. 3 illustrates embodiments of SA1 and SA2 where the rough area is comprised on SA1 or SA2.

In a passive valve that is based on the innovative principle the hydrophobic part (surface area 2) comprising the rough part is typically present as a hydrophobic zone in one, two, three, four or more of the inner side-walls at the position of the valve. The position of the hydrophobic zone in the flow direction may coincide with the position of a local change in geometric surface characteristics, although they may be present in different sidewalls. The hydrophobic zones in opposing sidewalls should be at essentially the same position along the flow path/microconduit. This kind of valve is typically present at outlet ends of volume-defining microcavities, reaction microcavities, outlet ends of microconduits etc, i.e. the same positions as for conventional passive valves that are based on a boundary between a hydrophilic and a hydrophobic surface area. This means that the rough part may be present in the hydrophobic surfaces 205a,b in FIG. 2; 321a, b, c,d, e; 322, 323, 335 in FIG. 3; 408,423 in FIG. 4; 607,608, 610 in FIG. 6; 809 in FIG. 8; 1007 in FIG. 10; 1206,1208 in FIG. 12; and 1310,1313 in FIG. 13a of WO 02074438 (Gyros AB).

In an anti-wicking function that is based on the innovative principle the hydrophobic surface area comprising the rough part typically is present as a hydrophobic zone in one, two, three, four or more inner sidewalls. The hydrophobic zones and roughened parts in opposing sidewalls are typically slightly displaced relative to each other (in the flow direction) if a valve function is to be minimized. The position in the flow direction of this kind of zone/hydrophobic part may partly or completely coincide with the position of a local change in geometric surface characteristics, for instance in different inner sidewalls. The boundary and the rough part in an anti-wicking function stretch between edges in the same manner as for valves. Anti-wicking functions are typically present immediately upstream to and/or between volume-metering microcavities that define a distribution manifold, and at other positions where it is important to keep undesired liquid transport by wicking at a minimum. This means that the roughened zone may be present in the hydrophobic surfaces 321 g, 314 in FIG. 3; 426 in FIG. 4b; 804/805 in FIG. 8a; 1106/1107 in FIG. 11b; 1209 in FIG. 12; and 1312 in FIG. 13 of WO 02074438 (Gyros AB).

In a vent that is based on the innovative principle, the hydrophobic surface area comprising the rough part may be present as a local hydrophobic zone or stretch from the venting position to the outlet end of the venting microconduit. The roughened zone may thus be present in the hydrophobic surfaces 208 in FIG. 2; 321,336 in FIG. 3, and 406 in FIG. 4 of WO 02074438 (Gyros AB).

Liquid-directing functions that are based on the innovative principle may be present within a microfluidic device, for instance at branchings of microchannel structures or in distribution manifolds between volume-defining microcavities to assist splitting of a larger liquid aliquot into smaller aliquots. This means that the rough part may be present in the hydrophobic surfaces 205a, 208 in FIG. 2; 321,336 in FIG. 3; 405, 406, 408 in FIG. 4; and 610 in FIG. 6 of WO 02074438 (Gyros AB). Liquid-directing functions according to the innovative principle may also define complementing hydrophilic flow paths in each surface of two planar substrates. When the two surfaces are apposed to each other at a capillary distance with complementary flow paths aligned, a microfluidic device will be formed in which the complementary flow paths will define the microchannel structures of the device. See further WO 9958245 (Gyros AB). The boundary between surface area 1 and surface area 2 may stretch between inner edges in the same manner as for valves, vents and anti-wicking functions in cases where liquid is to be directed into a particular branch at a branching.

Other kinds of liquid-directing functions according to the invention may be present on the outside of a microfluidic device and associated with inlet and/or outlet ports. Liquid-directing functions at an inlet port may assist in guiding liquid into a microchannel structure. Liquid-directing functions at an outlet port may assist in retaining liquid in the port and/or within the device. The roughened part may thus be present in the hydrophobic surfaces 321 of FIG. 3; 1105 of FIG. 11; and 1210 of FIG. 12 of WO 02074438 (Gyros AB).

The boundary between a surface area 1 and a surface area 2 may be part of one, two, three or more functionalities. Thus, a valve or a vent may also have an anti-wicking function and/or liquid-directing function, for instance.

In microconduits of a microfluidic device, the hydrophobic part (surface area 2) and/or only its rough part may extend in the flow direction along a distance that is from 0.1 times to 10, 100, 1000 or more times the width or depth of the microconduit. Comparison is made with the width and depth at the upstream or downstream end of the hydrophobic part.

Boundaries according to the innovative principle may also be used to define an array of hydrophilic spots on a hydrophobic surface or an array of hydrophobic spots on a hydrophilic surface. Arrays of hydrophilic spots may be used to collect liquid aliquots, for instance in the form of drops, with one aliquot on each spot. In the case the array is open to ambient atmosphere the liquid will evaporate thereby concentrating solutes to the hydrophilic spots surrounded by the roughened surface. This kind of design without roughening has been described in WO 02075775 (Gyros AB) (surfaces 1011 and 1012 of FIG. 7b). The boundary may be associated with a local change in geometric surface characteristics, for instance to define a well that will improve retaining of an aqueous aliquot as outlined without roughening in WO 02075775 (Gyros AB; 1011 and 1012 of FIG. 7b). Additional kinds of hydrophobic surfaces to which the innovative principle with roughening may be applied are given in WO 9958245 (Gyros AB).

Microfluidic Devices

A microfluidic device contemplates a device that comprises one or more microchannel structures in which liquid flow is used for transporting and processing liquid aliquots containing various kinds of reactants, analytes, products, samples, buffers and/or the like. Processing in this context means operations such as performing chemical and/or biological reactions, synthesizing, isolating, purifying, separating, fractionating, concentrating, diluting, mixing, volume-metering/defining, heating, cooling etc. The mere transporting of a liquid within a microchannel of a device does not qualify the device to be a microfluidic device. Typically at least some kind of fluidic function, such as a valve, needs to be present in the device and used, including also processing of the liquid.

A microconduits is a part of a microchannel structure and may be straight, branched, angled,curved etc. Microconduits and also microchannel structures in general have in preferred variants intersecting inner sidewalls that define length-going edges as discussed above for different functions. See also FIG. 1 of WO 02074438 (Gyros AB).

The volumes of the aliquots are typically in the nanoliter (nl) range. A microchannel structure comprises all the functionalities that are necessary for performing an intended experiment within the microfluidic device. Each structure typically contains one or more cavities and/or conduits that have a cross-sectional dimension that is $\leq 10^3$ µm, preferably $\leq 5 \times 10^2$ µm, such as $\leq 10^2$ µm. The nl-range has an upper limit of 5,000 nl. In most cases it relates to volumes $\leq 1,000$ nl, such as $\leq 500$ nl or $\leq 100$ nl.

A microchannel structure thus may comprise one, two, three or more functional parts selected among: a) inlet arrangement comprising for instance an inlet port/inlet opening, possibly together with a volume-metering unit, b) microconduits for liquid transport, c) reaction microcavity; d) mixing microcavity; e) unit for separating particulate matters from liquids (may be present in the inlet arrangement), f) unit for separating dissolved or suspended components in the sample from each other, for instance by capillary electrophoresis, chromatography and the like; g) detection microcavity; h) waste conduit/microcavity; i) valve; j) vent to ambient atmosphere; etc. A functional part may have more than one functionality, e.g. reaction microcavity and a detection microcavity may coincide. Various kinds of functional units in microfluidic devices have been described by Gyros AB/Amersham Pharmacia Biotech AB: WO 9955827, WO 9958245, WO 02074438, WO 0275312, WO 03018198, WO 03024598 and by Tecan/Gamera Biosciences: WO 0187487, WO 0187486, WO 0079285, WO 0078455, WO 0069560, WO 9807019, WO 9853311.

The microfluidic device may also comprise common microchannels/micro conduits connecting different microchannel structures. Common channels including their various parts such as inlet ports, outlet ports, vents, etc., are considered part of each of the microchannel structures they are communicating with.

Common microchannels make it possible to construe microfluidic devices in which the microchannel structures form networks. See for instance U.S. Pat. No. 6,479,299 (Caliper)

Each microchannel structure has at least one inlet opening for liquids and at least one outlet opening for excess of air (vents) that in certain variants also may be used for outlet of liquids.

The number of microchannel structures/device is typically $\geq 10$, e.g. $\geq 25$ or $\geq 90$ or $\geq 180$ or $\geq 270$ or $\geq 360$.

Different principles may be utilized for transporting the liquid within the microfluidic device/microchannel structures between two or more of the functional parts described above. Inertia force may be used, for instance by spinning the disc as discussed in the subsequent paragraph. Other useful forces are capillary forces, electrokinetic forces, non-electrokinetic forces such as capillary forces, hydrostatic pressure etc.

The microfluidic device typically is in the form of a disc. The preferred formats have an axis of symmetry ($C_n$) that is perpendicular to the disc plane, where n is an integer $\geq 2, 3, 4$ or 5, preferably $\infty$ ($C_\infty$). In other words the disc may be rectangular, such as in the form of a square, or have other polygonal forms. It may also be circular. Once the proper disc format has been selected centrifugal force may be used for driving liquid flow, e.g. by spinning the device around a spin axis that typically is perpendicular or parallel to the disc plane. In the most obvious variants at the priority date, the spin axis coincides with the above-mentioned axis of symmetry.

For preferred centrifugal-based variants, each microchannel structure comprises an upstream section that is at a shorter radial distance than a downstream section relative to the spin axis.

The preferred devices are typically disc-shaped with sizes and forms similar to the conventional CD-format, e.g. sizes that corresponds CD-radii that are the interval 10%-300% of the conventional CD-radii. The upper and/or lower sides of the disc may or may not be planar.

Microchannels/microcavities of a microfluidic device may be manufactured from an essentially planar substrate surface that exhibits the channels/cavities in uncovered form that in a subsequent step are covered by another essentially planar substrate (lid). See WO 9116966 (Pharmacia Biotech AB) and WO 0154810 (Gyros AB). The material of the substrates may be selected as discussed above.

Experimental Part

EXAMPLE 1

Preparation of Innovative Surfaces 0.4-2.0% (w/w) Aerosil™ R972 methylated silica colloids (DeGussa, d=11 nm) were added to a 0.05% solution of Teflon-AF™ 2400 (DuPont Polymers, DE, USA). The mixture was applied by spraying or dipping onto Zeonor™ 1420R (Zeon Corp., Japan) which had been surface treated with an oxygen plasma (Plasma Electronic, Germany). The resulting surfaces had advancing/receding water contact angles of 165-170°/130-170°.

2% (w/w) Aerosil™ R972 was added to PFC602A (Cytonix Corp., MD, USA), which is a 2% solution of polyperfluorooctalmethacrylate in HFE-7100 (3M Belgium N.V.). Sprayed or dipped surfaces had advancing/receding water contact angles of 169-174°/~165°.

The adhesion of these coatings to oxygen plasma-treated Zeonor™ could be greatly improved by mixing, for example 2% PFC602A in a 1:1 ratio with perfluorodecylmethacrylate and 0.1-0.4% Esacure™ TZT (Lamberti, Italy) and 1% Aerosil™ R972. The mixture required the addition of acetone (10%) in order to dissolve Esacure™ TZT. After drying, the coating was cured by illumination under a UV-lamp for 2 minutes (500 W, Efsen, Denmark). The resulting coating was wash stable to 95% ethanol, and had advancing/receding water contact angles of ~175°/135°.

Measurement of Contact Angles

Water contact angles were measured using a Ramé-Hart goniometer. Advancing contact angles were determined by increasing the drop volume until the contact line just started to move. The receding contact angle was determined in a similar way upon decreasing the drop volume.

EXAMPLE 2

Behavior of Liquids Containing Surface-Active Components on the Innovative Surfaces In many applications of microfluidic devices, hydrophobic surfaces in valves and in anti-wicking functions are subject to repeated contact with liquids containing surface-active components. These surface-active components may then adsorb to the hydrophobic surface, which in many cases gives rise to functional failure of valves and/or anti-wicking functions. In order to study if this problem could be overcome by the inventive concept a number of combinations of particles and hydrophobizing agents were tested for contact with liquids containing BSA (bovine serum albumin), serum, Tween etc. In some experiments short as well as prolonged contacts were compared. The effect was studied as advancing contact angles and compared with the surface tension of each solution. Table 1 gives representative results for a deposition solution containing Teflon AF (0.05% in FC-75) and dispersed 5 μm particles (2% Chromasil-$NH_2$, Eka Nobel, Sweden). The solution was sprayed onto a surface of Zeonor and dried before subsequent measurements.

TABLE 1

Contact angles and surface tensions of different solutions containing surface active agents. Plastics: Zeonor.

| Solution | Advancing contact angle/smooth surface | Advancing contact angle/rough surface | Surface tension |
|---|---|---|---|
| Water | 135 | 165 | 77 |
| 1% BSA in PBS/short contact | 125 | 158 | 52 |
| 1% BSA in PBS/prolonged contact (90 s) | 123 | 140 | 52 |
| serum | # | # | 50 |
| Tween 0.1% | 96 | 106 | 37* | see text

*Surface tension extrapolated from values measured for Tween 20 concentrations of 0.012% (39 mJ · m$^{-2}$) and 1.2% (35 mJ · m$^{-2}$).
Note:
even the lowest concentration is higher than the critical micelle concentration (cmc = 0.0072%).

The rough surface is according to the invention and the smooth surface according to the prior art.

This results show that the innovative surface remains superhydrophobic on contact with 1% BSA, the advancing contact angle decreasing somewhat after a longer contact with 1% BSA. While the advancing contact angle was not measured directly for serum, the small difference in surface tension between 1% BSA and serum would suggest that enhanced hydrophobicity is maintained even for the latter. Surface tension of Tween 20 solutions is considerably lower, so that contact angles on both smooth and rough Teflon AF surfaces is considerably reduced. The difference in advancing contact angles between rough and smooth surfaces is also reduced.

Certain innovative aspects of the invention are defined in more detail in the appending claims. Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A microfluidic device comprising a microconduit for transport and/or processing of liquid, wherein said microconduit comprises a reusable passive valve and/or anti-wicking function and/or inlet vent to ambient atmosphere and/or outlet vent to ambient atmosphere, wherein the inner surface of at least one such passive valve and/or anti-wicking function and/or inlet vent to ambient atmosphere and/or outlet vent to ambient atmosphere comprises a smooth hydrophilic liquid contact surface area (surface area 1) that is delineated in at least one direction by a boundary to a hydrophobic surface area (surface area 2), wherein said hydrophobic surface area 2 comprises a smooth portion and a rough part that stretches along the boundary.

2. The microfluidic device of claim 1, wherein the roughness of said rough part is introduced by a method comprising additive or destructive roughening.

3. The microfluidic device of claim 2, wherein said roughening comprises additive roughening by deposition of particles.

4. The microfluidic device of claim 3, wherein said particles are deposited in dispersed form and the liquid phase of the dispersion preferably comprises an agent promoting adherence of the particles to surface area 2.

5. The microfluidic device of claim 3, wherein the particles are deposited in dry form subsequent to pre-treatment of surface area 2 to allow for adherence of the particles.

6. The microfluidic device of claim 3, wherein the roughness is introduced by additive roughening comprising applying the particles together with a hydrophobic adherence-promoting agent and/or hydrophobizing the rough part including the particles after the application of the particles.

7. The microfluidic device of claim 2, wherein the roughness is introduced by chemical and/or mechanical destructive roughening.

8. The microfluidic device of claim 1, wherein the rough part exposes a hydrophobic polymer on its surface.

9. The microfluidic device of claim 1, wherein said surface area 1, the boundary and said surface area 2 are defined on a substrate comprising a plastic material.

10. The microfluidic device of claim 1, wherein said microconduit has two or more inner sidewalls that pair-wise intersect each other to define one or more inner edges which each extends along said at least one microconduit, and said boundary extends between said one or more edges in at least one of said inner sidewalls.

11. The microfluidic device of claim 10, wherein said boundary extends in a direction essentially perpendicular to the transport direction in said microconduit.

12. The microfluidic device of claim 1, wherein
  a) said surface area 1 is a spot (hydrophilic spot 1) completely delineated by said boundary and present on an array surface comprising an array of hydrophilic spots of essentially the same size and form as said hydrophilic spot 1,
  b) the array surface is present on one, two or more inner sidewalls of a microcavity that is part of said microconduit, and
  c) the distance between an inner wall, which comprises said array surface, and the opposing inner sidewall is $\leq 2000$ µm.

13. The microfluidic device of claim 1, wherein said surface area 2 is located on the outside of the device in association with an opening of the microconduit and partially or completely surrounds the opening.

14. The microfluidic device of claim 1, wherein said microconduit structures comprises two or more of said surface area 2.

15. The microfluidic device of claim 3, wherein the diameter of the particles is at least $\leq 15$ µm.

16. The microfluidic device of claim 4, wherein said particles are deposited by spraying or printing.

17. The microfluidic device of claim 1, wherein said surface area 1, the boundary, and said surface area 2 are defined on a substrate comprising a inorganic material.

18. The microfluidic device of claim 17, wherein the inorganic material is glass, silica, or metal.

19. The microfluidic device of claim 18, wherein the metal is a metal alloy or metal oxide.

20. The microfluidic device of claim 10, said inner sidewalls that pair-wise intersect each other define four inner edges.

21. The microfluidic device of claim 1, wherein the average roughness ($R_a$) of the rough part is between 0.01 and 15 µm.

22. The microfluidic device of claim 21, wherein the average roughness ($R_a$) of the rough part is between 0.5 and 10 µm.

* * * * *